United States Patent
Krumm et al.

(10) Patent No.: US 8,128,716 B2
(45) Date of Patent: Mar. 6, 2012

(54) METHOD AND DEVICE FOR PYROLYSIS AND GASIFICATION OF SUBSTANCE MIXTURES CONTAINING ORGANIC CONSTITUENTS

(75) Inventors: Wolfgang Krumm, Wenden (DE); Günter Funk, Siegen (DE); Stefan Hamel, Wenden (DE); Christian Mertens, Braunfels (DE)

(73) Assignee: Herhof Verwaltungsgesellschaft mbH, Solms-Niederbiel (DE)

(*) Notice: Subject to any disclaimer, the term of this patent is extended or adjusted under 35 U.S.C. 154(b) by 921 days.

(21) Appl. No.: 10/332,668

(22) PCT Filed: Jul. 3, 2001

(86) PCT No.: PCT/EP01/07607
§ 371 (c)(1),
(2), (4) Date: Jan. 10, 2003

(87) PCT Pub. No.: WO02/04574
PCT Pub. Date: Jan. 17, 2002

(65) Prior Publication Data
US 2003/0140559 A1    Jul. 31, 2003

(30) Foreign Application Priority Data
Jul. 10, 2000 (DE) .................................. 100 33 453

(51) Int. Cl.
*C10J 3/68* (2006.01)
*C10J 3/46* (2006.01)
*B01J 7/00* (2006.01)
*C01B 3/36* (2006.01)
*C01B 6/24* (2006.01)

(52) U.S. Cl. ................ 48/77; 48/61; 48/197 R; 423/644
(58) Field of Classification Search ................ 48/61, 62, 48/71, 98, 101, 197, 77; 422/188–10, 198–203, 422/232, 235; 423/644
See application file for complete search history.

(56) References Cited

U.S. PATENT DOCUMENTS

| | | | | |
|---|---|---|---|---|
| 3,189,538 | A * | 6/1965 | Pohlenz et al. | 208/51 |
| 3,926,591 | A * | 12/1975 | Wildmoser et al. | 95/180 |
| 3,966,634 | A * | 6/1976 | Sacks | 252/373 |
| 4,184,322 | A * | 1/1980 | Paull et al. | 60/780 |
| 4,211,606 | A * | 7/1980 | Ponomarev et al. | 201/12 |
| 4,325,815 | A * | 4/1982 | Metrailer | 208/127 |
| 4,430,096 | A * | 2/1984 | Schnur et al. | 48/206 |
| 4,568,362 | A * | 2/1986 | Deglise et al. | 48/209 |
| 5,550,312 | A * | 8/1996 | Schingnitz et al. | 588/320 |

(Continued)

FOREIGN PATENT DOCUMENTS
DE        2935669        3/1981
(Continued)

*Primary Examiner* — Matthew Merkling
(74) *Attorney, Agent, or Firm* — Dilworth & Barrese, LLP

(57) ABSTRACT

A method serves for the pyrolysis and gasification of substance mixtures containing organic constituents. The organic substances (4) or the substance mixture containing the organic constituents are brought into contact with a heat transfer medium, for preference the ash (5) from a combustion reactor (2) in a pyrolysis reactor (1), for preference a shaft reactor and pyrolysed. The pyrolysis coke (10) derived from the pyrolysis is combusted in a combustion reactor (2), for preference a fluidised bed reactor, under the admission of air (11). In order to improve such a method, the raw gas (6) generated by the pyrolysis is purified in a crack reactor (3), for preference by a catalyst.

17 Claims, 10 Drawing Sheets

Figure 1:
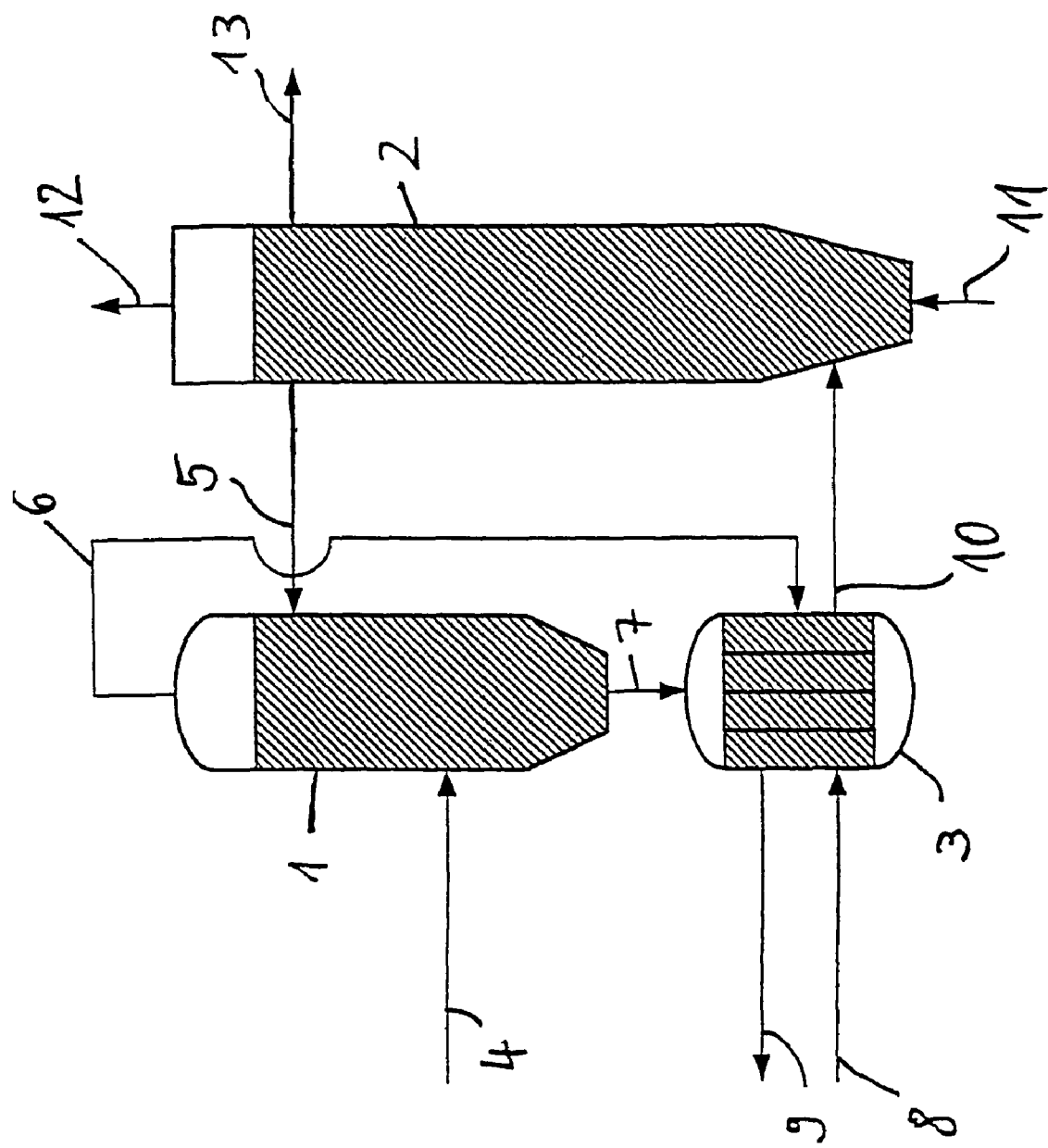

U.S. PATENT DOCUMENTS 5,895,508 A * 4/1999 Halow ............................ 48/77
5,955,039 A * 9/1999 Dowdy ........................ 422/189

FOREIGN PATENT DOCUMENTS

| | | |
|---|---|---|
| DE | 3412582 | 10/1985 |
| DE | 4327320 | 3/1994 |
| DE | 4447357 | 6/1996 |
| DE | 19642161 | 4/1998 |
| DE | 19755693 | 7/1999 |
| DE | 19756538 | 9/1999 |
| DE | 19830765 | 1/2000 |
| DE | 199068691 | 8/2000 |
| DE | 19930071 | 2/2001 |
| GB | 2055890 A * | 3/1981 |
| WO | 91/04306 | 4/1991 |
| WO | 01/02513 | 1/2001 |
| WO | 01/21730 | 3/2001 |

* cited by examiner

METHOD AND DEVICE FOR PYROLYSIS AND GASIFICATION OF SUBSTANCE MIXTURES CONTAINING ORGANIC CONSTITUENTS

The invention relates to a process for the pyrolysis and gasification of substance mixtures containing organic constituents, and a device for the performance of such a method.

Substance mixtures may relate in particular to domestic waste or waste of a similar nature to domestic waste, which is derived from domestic waste or waste of a similar nature to domestic waste.

Methods and devices for the pyrolysis and gasification of organic substances are already known. DE-PS 197-55 693 discloses a method for the gasification of organic substances in which the organic substances are conducted into a pyrolysis reactor in which they are brought into contact with a heat conveying medium, as a result of which pyrolysis occurs. The pyrolysis reactor is a moving-bed reactor or a rotary drum. The products of the pyrolysis consist of pyrolysis gases with condensable substances and a solid residue containing carbon. The solid residue containing carbon and the heat transfer medium are conducted to a firing process, in which the residue containing carbon is combusted and the heat transfer medium heated and conducted once again to the pyrolysis reactor. The pyrolysis gases containing tar are subsequently heated in a second reaction zone in such a way that a purified synthesis gas with high calorific value is obtained. This happens in such a way that the pyrolysis gases containing tar is conducted into an indirect heat exchanger, in which they react with a reaction agent, such as water vapour. The waste firing gases are conducted through the indirect heat exchanger in such a way that their thermal content is exploited for the reaction of the pyrolysis gases with the reaction agent. The ashes of the solid residues containing carbon and from the heat transfer medium, derived from the firing, are conducted back into the pyrolysis reactor at the intake end for the organic substances.

The older priority and not previously published Patent Application 199 30 071.2 relates to a method and device for the pyrolysis and gasification of organic substances, in which the organic substances are brought into a drying and pyrolysis reactor, in which they are brought into contact with the fluidised bed material of a combustion fluidised bed, as a result of which a drying and pyrolysis process takes place, in which the organic substances are converted into water vapour from the products of drying and pyrolysis. The pyrolysis products consist of gases with condensable substances and solid residue containing carbon. The solid residue containing carbon, if appropriate with portions of the water vapour and the pyrolysis gases with condensable substances and the fluidised bed material are conducted back into the combustion fluidised bed, in which the residue containing carbon of the organic substances are combusted, and the fluidised bed material is heated and conducted back into the pyrolysis reactor. The water vapour from the drying process and the pyrolysis gases with condensable substances are subsequently treated in a further reaction zone in such a way that a product gas with high calorific value is formed. The combustion fluidised bed in which the pyrolysis residue is combusted is operated as a stationary fluidised bed. The pyrolysis gases are conducted into an indirect heat exchanger, in which, as appropriate, they react with a reaction agent such as water vapour, oxygen, or air, or a mixture thereof. The waste firing gases are brought into contact with the indirect heat exchanger in such a way that their thermal content is exploited for the reaction of the pyrolysis gases with the reaction agent.

With the known method according to DE-PS 197 55 693, and also with the method according to the older priority German Patent Application 199 30 071.2, in each case an indirect heat exchanger is used to which the heat of the waste firing gases is conducted and through which the pyrolysis gases are conducted. This method and the device required for the performance of such a method are, however, encumbered with disadvantages.

The problem of the invention is to propose an improved method for the pyrolysis and gasification of substances mixtures which contain organic constituents, and an improved device for the performance of such a method.

With a method of this type, this problem is resolved by the features of claim 1. A device according to the invention is the object of claim 27. Advantageous further embodiments of the method and device according to the invention are described in the sub-claims.

With the method according to the invention, the organic substances or substance mixture containing organic substances respectively are brought into contact in a pyrolysis reactor with a heat transfer medium from a combustion reactor and pyrolysed. The pyrolysis reactor is for preference a shaft reactor. As the combustion reactor a fluidised bed reactor is used for preference. The heat transfer medium is for preference formed from the ashes from the combustion reactor. It is also possible, however, to use another heat transfer material or fluidised bed material. The heat transfer medium and the fluidised bed material respectively can contain ashes from the combustion reactor or consist exclusively or practically exclusively of these ashes. It is to advantage if the organic substances are brought into contact with the heat transfer medium in such a way that they are mixed with one another. The organic substances and the heat transfer medium are brought into contact in the pyrolysis reactor, and mixed and dried and pyrolysed. The pyrolysis coke which is derived from the pyrolysis is combusted in the combustion reactor or fluidised bed reactor respectively.

According to the invention, the raw gas created by the pyrolysis is purified in a crack reactor. For preference, this purification takes place by means of a catalyst which is provided in the crack reactor. This purification or catalytic purification takes place for preference under the addition of water vapour.

With the method according to the invention, there is no longer any requirement for a heat transfer device or heat exchanger to which the heat from the firing phase is conducted from the combustion reactor and into which the pyrolysis gases are conducted.

The method according to the invention is particularly well-suited for the pyrolysis and gasification of a substance mixture which has been derived from domestic waste or waste of a similar nature to domestic waste. This involves for preference a substance mixture which has been formed from domestic waste or waste of a similar nature to domestic waste in accordance with the following method: The domestic waste or waste of a similar nature to domestic waste is, as required, first subjected to preliminary processing, and in particular comminuted. It is subsequently composted in closed containers under forced ventilation, whereby the organic substances are decomposed. After a specific period of time, for example of seven days—after this period the biologically more easily decomposable constituents are typically decomposed in whole or to a substantial part—the composting is brought to a standstill by drying. The material is dried to a residual moisture content if maximum 15%. It may then, if required, be subjected to subsequent processing. A material of this nature is commercially available under the name Trockenstabilat®.

For preference, the pyrolysis coke from the pyrolysis reactor is used as the catalyst for the raw gas. The catalytic effect of the pyrolysis coke is exploited in this manner. As a catalyst for the raw gas, the pyrolysis coke can be used alone or with one or more further catalysts.

A further advantageous embodiment is characterised in that a fine fraction is screened off from the organic substances prior to the pyrolysis. The fine fraction can also be separated in another manner. For preference, the fine fraction screened off or separated in another manner is conducted to the combustion reactor. The screening or other separation and/or the conducting of the fine fraction to the combustion reactor are of advantage in particular in the processing of Trockenstabilat®. Because the fine fraction of the Trockenstabilat® contains a substantial proportion of inerts (ash) and contaminant substances, this is for preference screen off or otherwise separated. It is further to advantage conducted directly to the fluidised bed reactor for further treatment. Accordingly, the advantage can be attained that the contaminant burden of the input material (Trockenstabilat®) is conducted via the fluidised bed reactor directly to the flue gas purification system, i.e. without diversion through the shaft reactor and the crack reactor. The flue gas purification is carried out in accordance with the applicable environmental protection regulations, in Germany at the present time in accordance with the 17th Federal Immission Protection Decree (BImSchV). This prevents the contaminant burden from passing into the environment. A further advantage lies in the fact that the calorific value of the coarse fraction is increased in comparison with the original material, since the fine portion of the Trockenstabilat® contains a higher proportion of inerts (ash).

From the purification or catalytic purification of the raw gas, a synthesis gas ("combustion gas") can be produced. The synthesis gas is for preference exploited for energy in a gas turbine or in another heat engine. It is to advantage if the waste gas from the energy exploitation process or the gas turbine or other heat engine is conducted to the combustion reactor or the fluidised bed reactor. Air can also be conducted to the combustion reactor or fluidised bed reactor in addition to this waste gas. It is also possible, however, for the combustion reactor or fluidised bed reactor to be operated not with air but exclusively with the waste gas from the turbine or the other heat engine. This is possible, because the waste gas from the gas turbine or other heat engine always still has a sufficient oxygen content, which can amount to some 17%. This makes a particularly good energy exploitation possible.

According to a further advantageous embodiment, the synthesis gas is initially cooled and/or purified before it is used for the combustion chamber of the gas turbine or other heat engine. The cooling and/or purification takes place for preference in a quench. For preference, the waste water from the cooling and/or purification is evaporated, for preference in a drying device. The residue from the evaporation (the "thickened" or concentrated residue) is for preference conducted to the combustion reactor.

A further advantageous embodiment is characterised in that, by means of the purification or catalytic purification of the raw gas, a synthesis gas is produced. For preference, hydrogen is separated from the synthesis gas. The lean gas which remains with the hydrogen separation is for preference conducted to the combustion reactor, and can be thermally exploited there.

It is to advantage if the combustion reactor or fluidised bed reactor is operated as a two-step process. This can be effected in particular in that less air is introduced at the lower end of the combustion reactor or fluidised bed reactor than is required for stoichiometric combustion. As a result, the ash which is conducted to the pyrolysis reactor or shaft reactor respectively still contains coke, which therefore already has a catalytic effect in the upper part of the pyrolysis reactor (shaft reactor, degasifier). Additional air is added above the system for conveying the ash out of the combustion reactor, in order to achieve complete combustion and to be able to discharge the waste gas—purified—into the environment.

Figure 6:
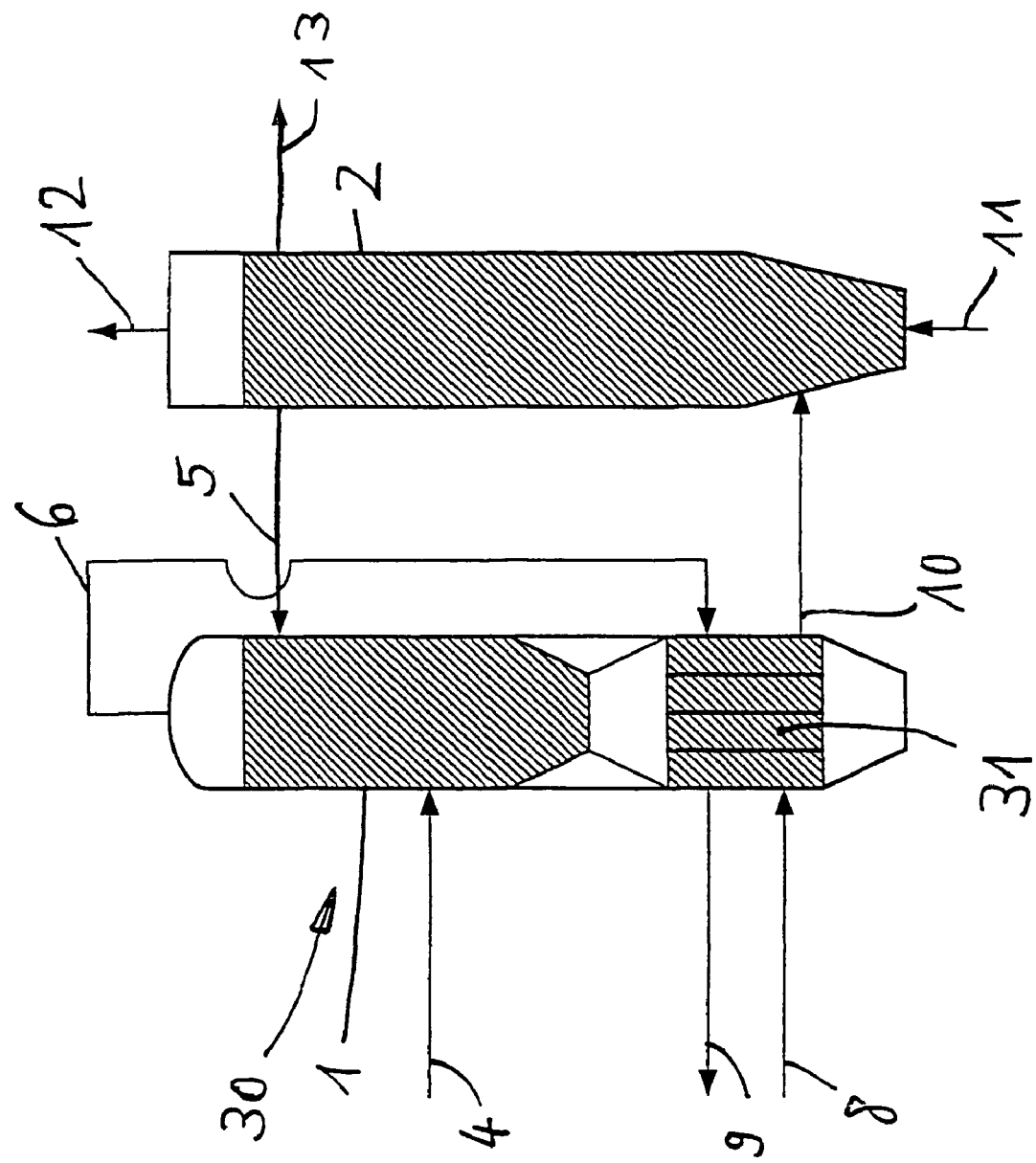
Figure 10:
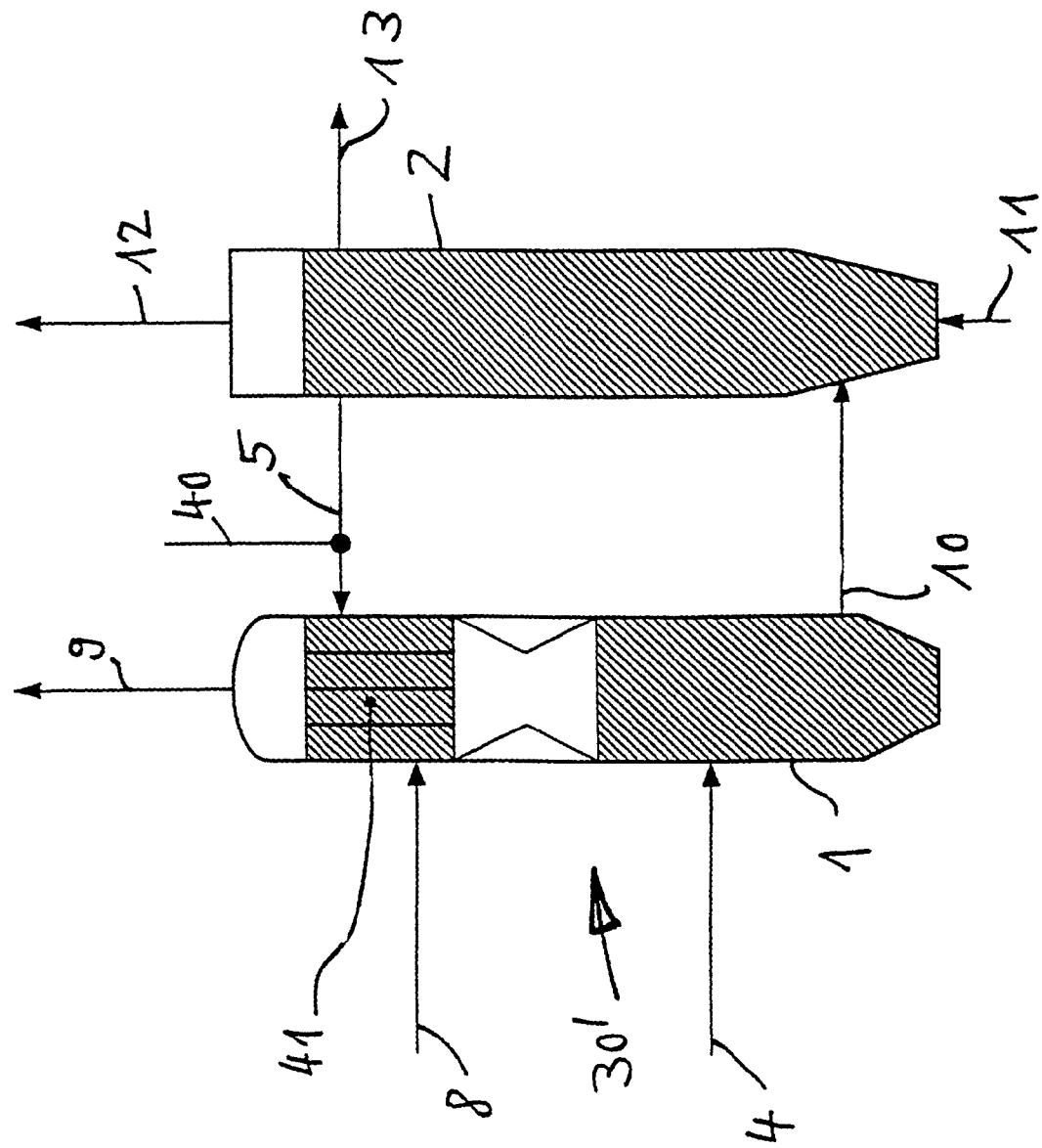

A further advantageous embodiment is characterised in that a zone of the pyrolysis reactor or the shaft reactor respectively is used as a crack reactor. This can be effected in that the pyrolysis reactor or shaft reactor respectively and the crack reactor are designed as one "pyrolysis-crack reactor" component, so that a zone of the pyrolysis reactor is used as a catalytic converter (FIG. 6). It can further be effected in that the crack reactor is located above the pyrolysis reactor or shaft reactor respectively, or that the crack reactor is located in the upper area of the pyrolysis reactor or shaft reactor respectively (FIG. 10).

A further advantageous embodiment is characterised in that the raw gas purified in the crack reactor is further purified in a further reactor with a catalyst filling (FIG. 7) or that the crack reactor is designed as a reactor with a catalyst filling. The catalyst filling in the further reactor can consist of one or more metal compounds (permanent catalyst). Once the gas has left the crack reactor, it is conducted to the further reactor. The crack reactor functions in this case as a preliminary reactor. The crack reactor is then not absolutely necessary. It is also possible to do without the crack reactor, so that the further reactor with the catalyst filling can in this case function as the actual crack reactor for the catalytic purification of the raw gas created by the pyrolysis.

It is of particular advantage if the raw gas purified in the crack reactor is further purified in a further reactor with a catalyst filling, i.e. if, in addition to the first further reactor with a catalyst filling, a second further catalytic converter with a catalyst filling is present. In this situation it is of particular advantage if the first and the second further reactor are activated alternately. The first and the second further reactor are therefore operated in such a way that they are active alternately. As a result of this, a further advantageous embodiment is made possible, which consists of the first and the second further reactor being capable of being regenerated alternately, namely in each case when the other further reactor is activated. The regeneration takes place for preference by means of hot waste gas from the combustion reactor or fluidised bed reactor. With the use of a first further reactor and a second further reactor, it is also possible to do without the crack reactor. The first and the second further reactor then serve as the actual crack reactors for the catalytic purification of the raw gas created by the pyrolysis.

A further advantageous embodiment is characterised in that the catalyst is added with the heat transfer medium, or that the catalyst is effective together with the heat transfer medium. As has already been described, the pyrolysis coke from the pyrolysis reactor can be used as the catalyst for the raw gas. As a result, the catalytic effect of the pyrolysis coke produced in the pyrolysis reactor or shaft reactor respectively is exploited. In order to achieve this, the crack reactor is integrated into the flow of solids from the pyrolysis reactor or shaft reactor into the combustion reactor or fluidised bed reactor. If the temperature level is taken into account, however, a gas treatment would be desirable, i.e. a catalytic purification of the raw gas, in that area of the pyrolysis reactor or shaft reactor in which the ash from the combustion reactor or fluidised bed reactor is conducted, since it is there that the ash (heat transfer medium, fluidised bed material) has the highest temperature.

In order to attain this, the method is for preference applied in such a way that the catalyst is added together with the heat transfer medium (ash) and that the catalyst takes effect together with the heat transfer medium (ash). For example, the catalyst can be added in the upper part of the pyrolysis reactor or shaft reactor. This can take place together with the ash. The catalyst can, however, also be added in other manners. In addition, the catalyst may be present in a crack reactor to which the ash is conducted.

It is possible for a permanent catalyst to be used, such as metal oxide. If a permanent catalyst is used, a circuit is created through the combustion reactor or fluidised bed reactor, whereby the thermal purification of the catalyst takes place in the firing. It is, however, also possible for a lost catalyst to be used, such as coke or coal.

The device according to the invention for the pyrolysis and gasification of substance mixtures containing organic constituents, which is particularly well-suited for the performance of the method, comprises a pyrolysis reactor, for preference a shaft reactor, to which can be introduced the organic substances or the substance mixture which contains the organic constituents, for preference Trockenstabilat® and a heat transfer medium, and a combustion reactor, for preference a fluidised bed reactor, for the combustion of the pyrolysis coke from the pyrolysis reactor or shaft reactor and for the production of the heat transfer medium. As the heat transfer medium, use is made for preference of the ash from the combustion reactor. According to the invention, a crack reactor is provided for purifying the raw gas created by the pyrolysis. For preference, a catalyst is provided in the crack reactor.

Advantageous embodiments are described in the further sub-claims.

By means of the invention, a method and device are provided by means of which a raw gas can be produced from a fuel with a specific ash content and high volatile content, which is well-suited both for use in gas turbine processes and combustion engines as well as for the recycling of solid materials, which is therefore of high value. In this situation the aim is achieved of no technical oxygen needing to be used, and that the pyrolysis gas does not come in contact with inert gases. The invention is particularly well-suited for the processing of Trockenstabilat®. In this situation is may be assumed that the fine portion of the Trockenstabilat® on the one hand contains an above-average volume of contaminants, and, on the other, a high inert portion (approx. 50% by weight); i.e. that the contribution of the fine portion to the high-value gas is therefore low, and the negative effects on the expenditure and effort for the pyrolysis gas purification are relatively high. The heat transfer medium is produced from the pyrolysis coke by way of combustion. In this situation, the entire utilisation material (organic substances, in particular Trockenstabilat®) runs through with the fine portion of the pyrolysis, and imposes a burden on the gas purification. For preference, the fine portion is conducted directly to combustion; in the combustion reactor, the heat transfer medium is produced from this fine portion and the pyrolysis coke. The volatile contaminants of the fine portion can, as a result, be separated in the combustion process and screened out in the waste gas purification process. This excludes the risk of contaminants passing from the fine portion into the pyrolysis gas and the gas purification process being unnecessarily elaborate and expensive.

The pyrolysis gas or synthesis gas respectively which occurs during the implementation of the invention can be used for material and energy exploitation, in particular for the generation of electricity, for the generation of heat, for the production of methanol, or for the production of hydrogen. It is possible to create a gas rich in hydrogen. The invention can be used for the generation of electric current, in particular in a gas turbine. The gas turbine gas can be used as combustion and fluidisation air in the fluidised bed of the fluidised bed reactor. The system must then be operated under pressure, however, or a combustion gas compressor is to be provided. The firing in the combustion reactor or fluidised bed reactor supplies heat for the pyrolysis reactor. In addition, by means of the fluidised bed the heat transfer medium, namely ash, is generated internally in the process. If coke or pyrolysis coke is used as the catalyst material, this can likewise be produced internally in the process by gradated air infeed in the fluidised bed. The conduct of the method with sub-stoichiometric combustion is possible. It is also possible for subsequent treatment of the pyrolysis gases to be carried out directly in the degasifier (pyrolysis reactor); the degasification and cracking can therefore take place in one reactor.

Figure 2:
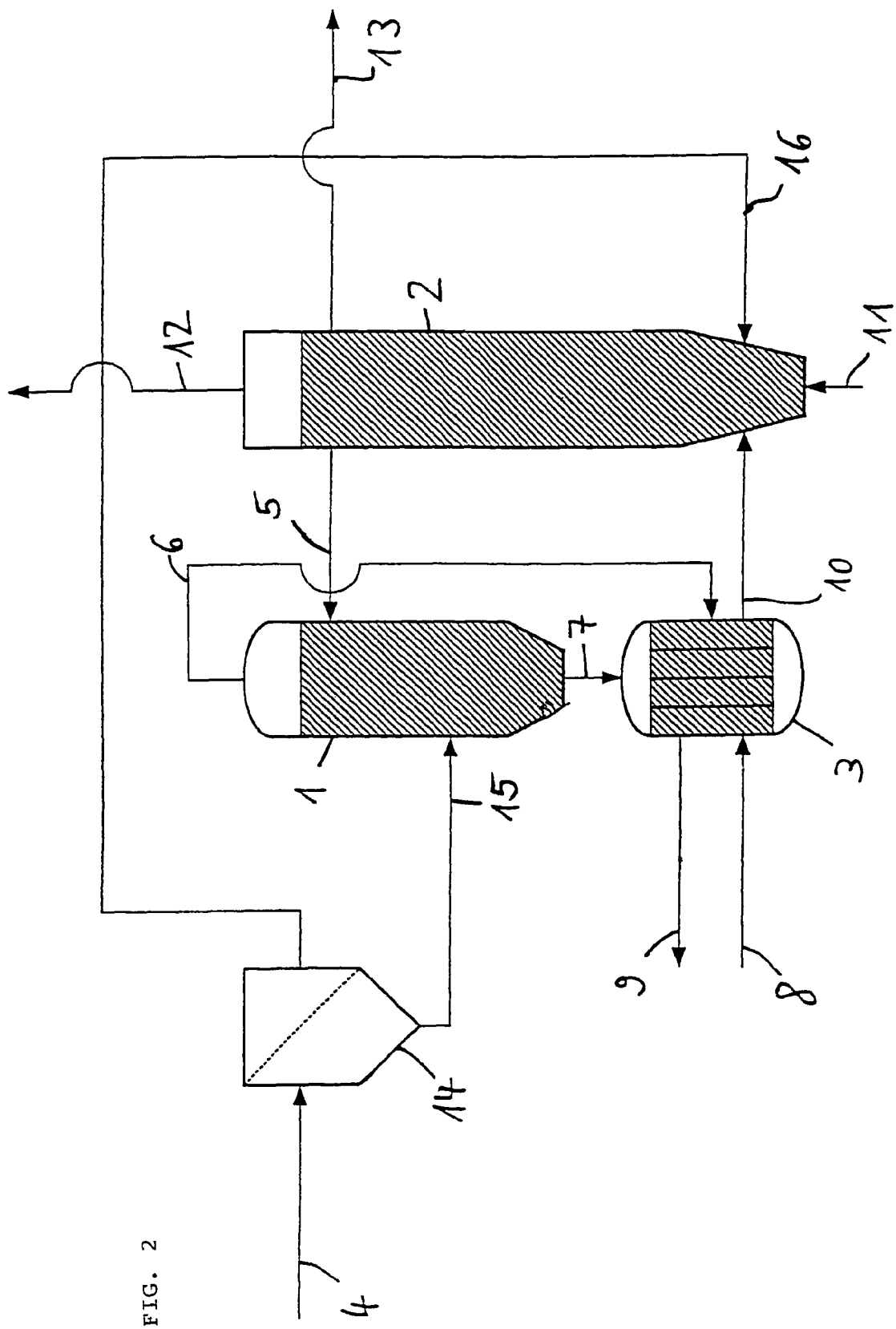
Figure 3:
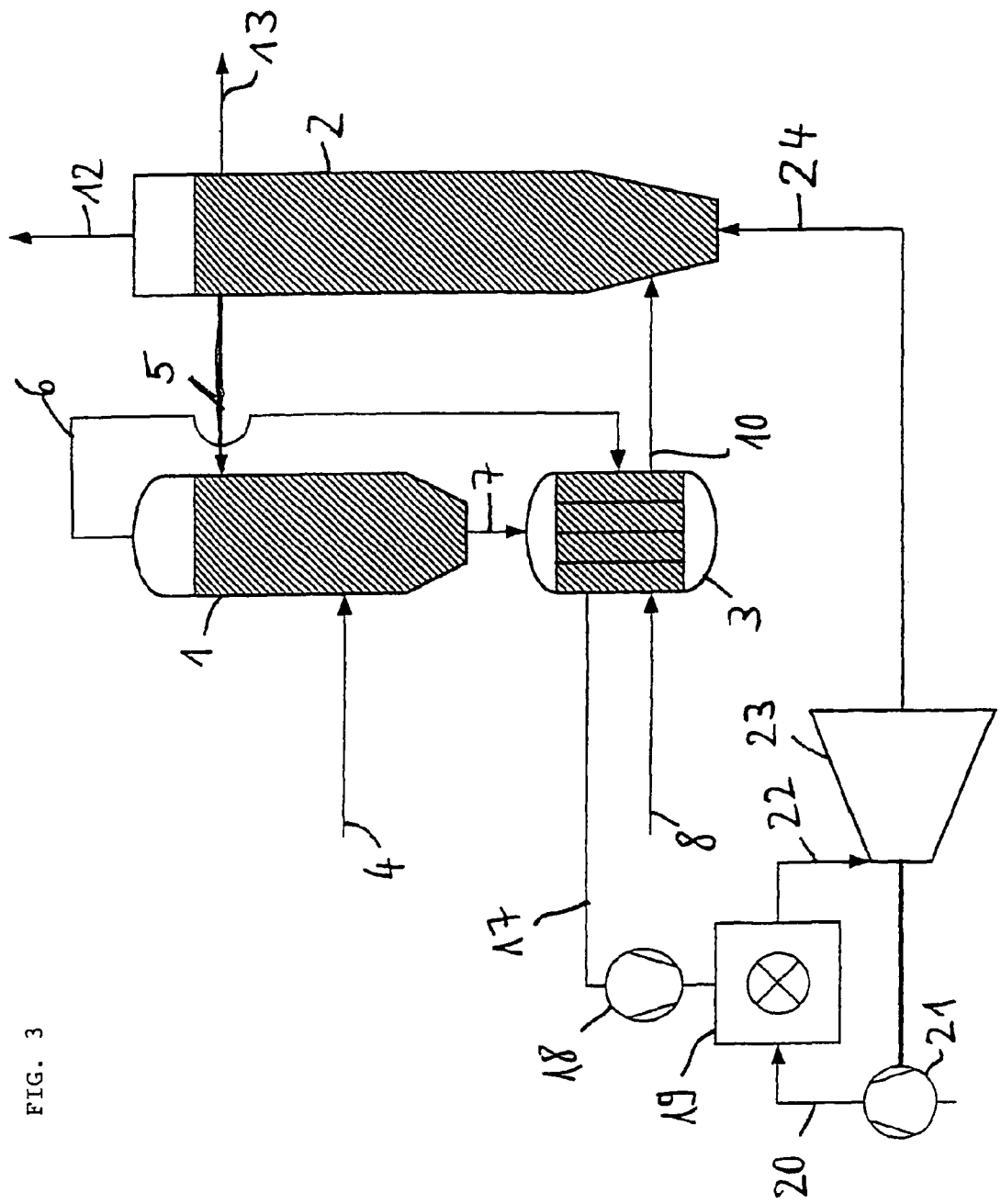
Figure 4:
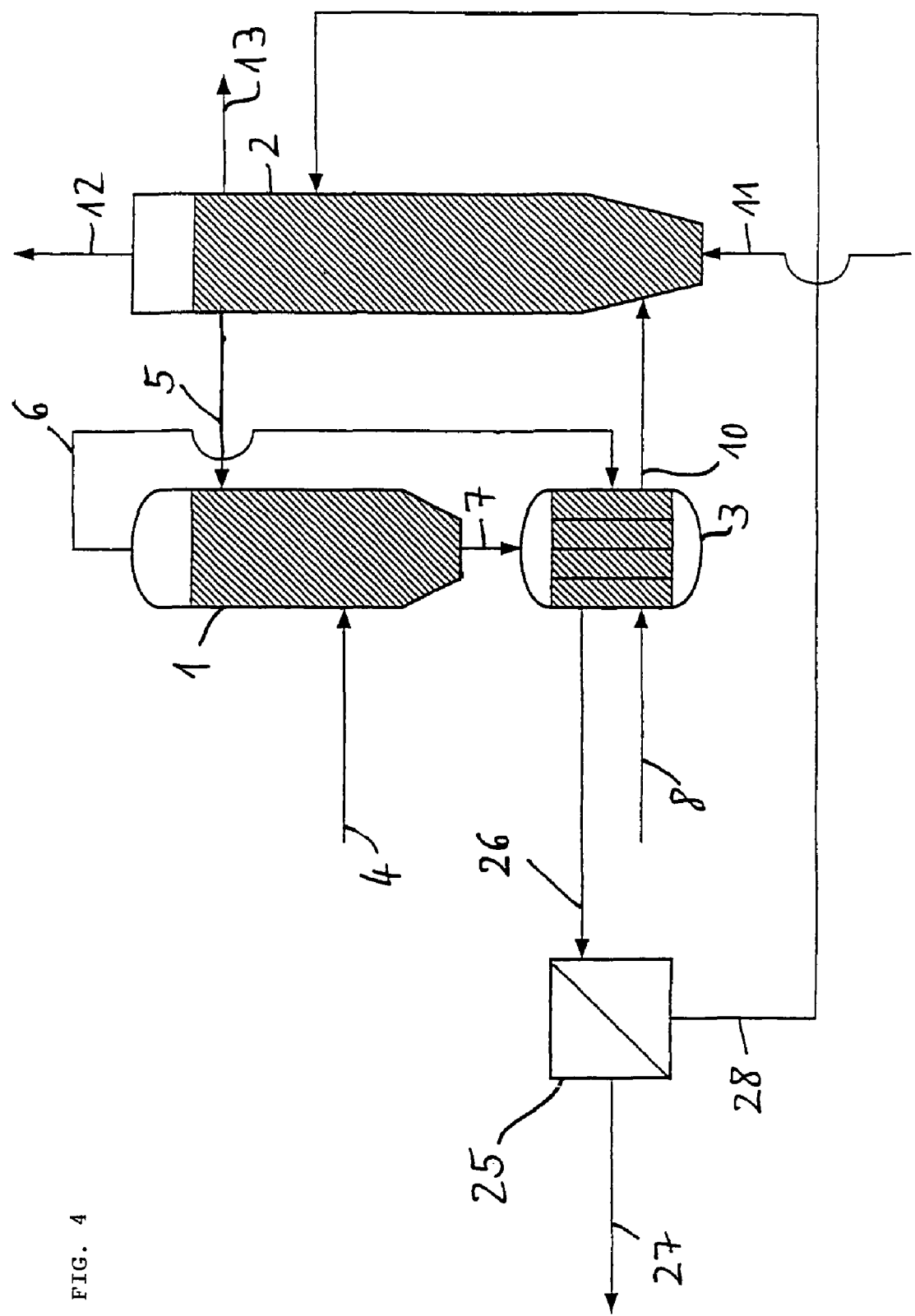
Figure 5:
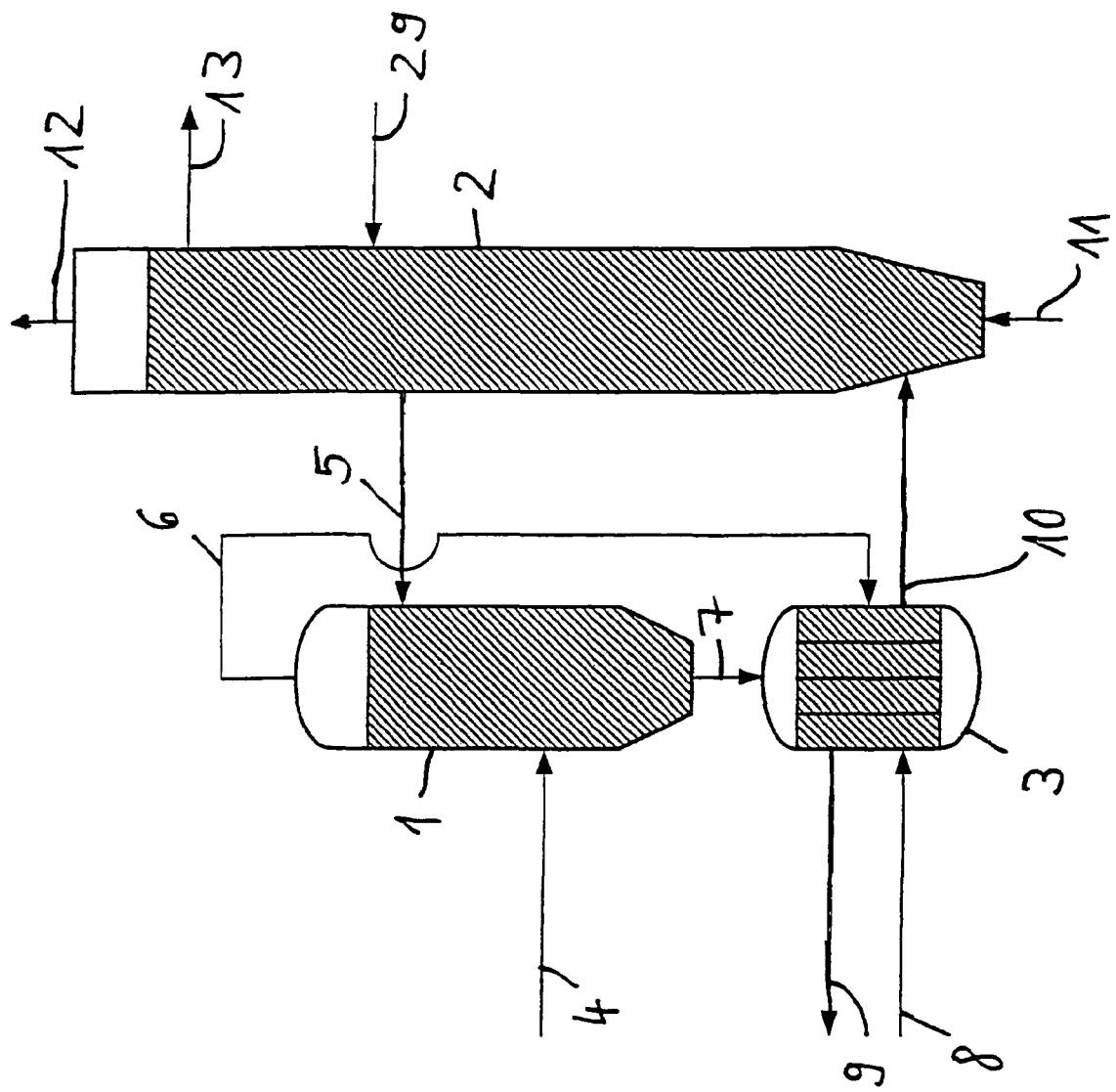
Figure 7:
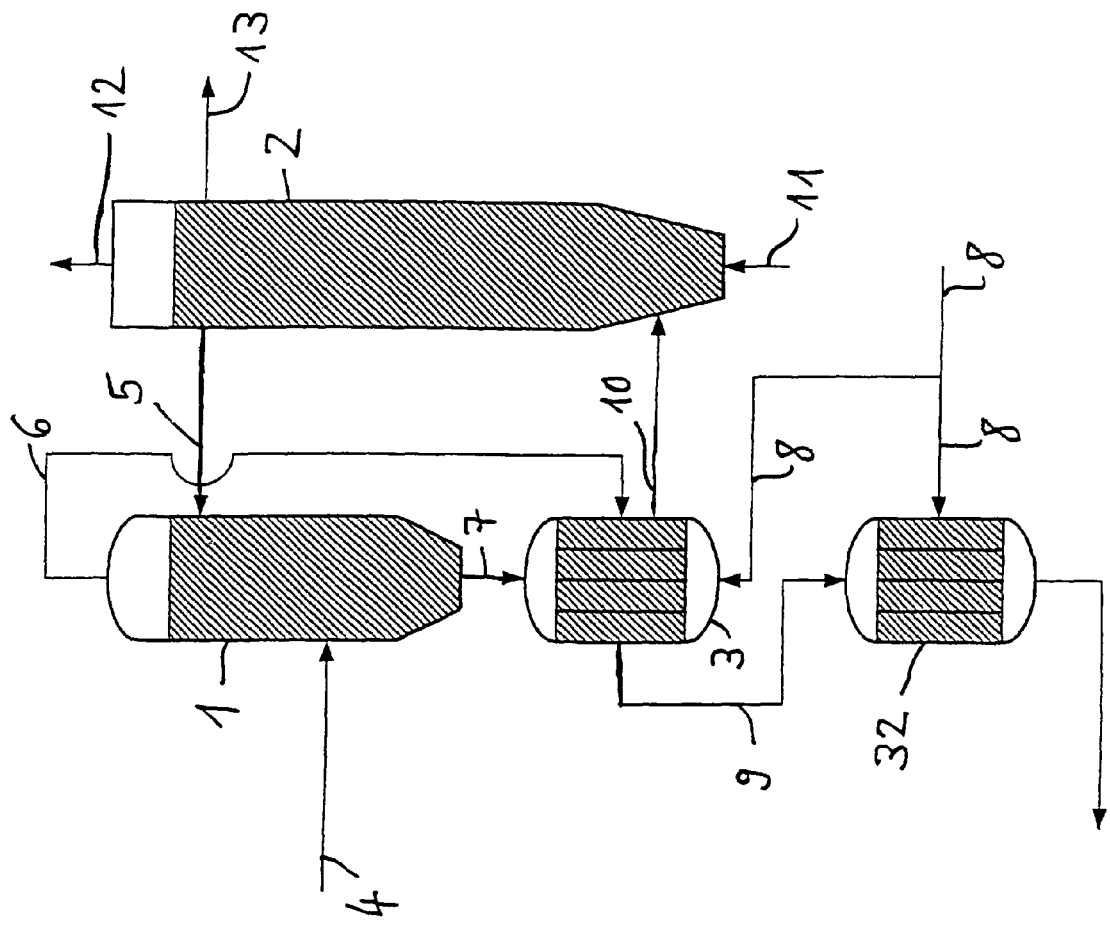
Figure 8:
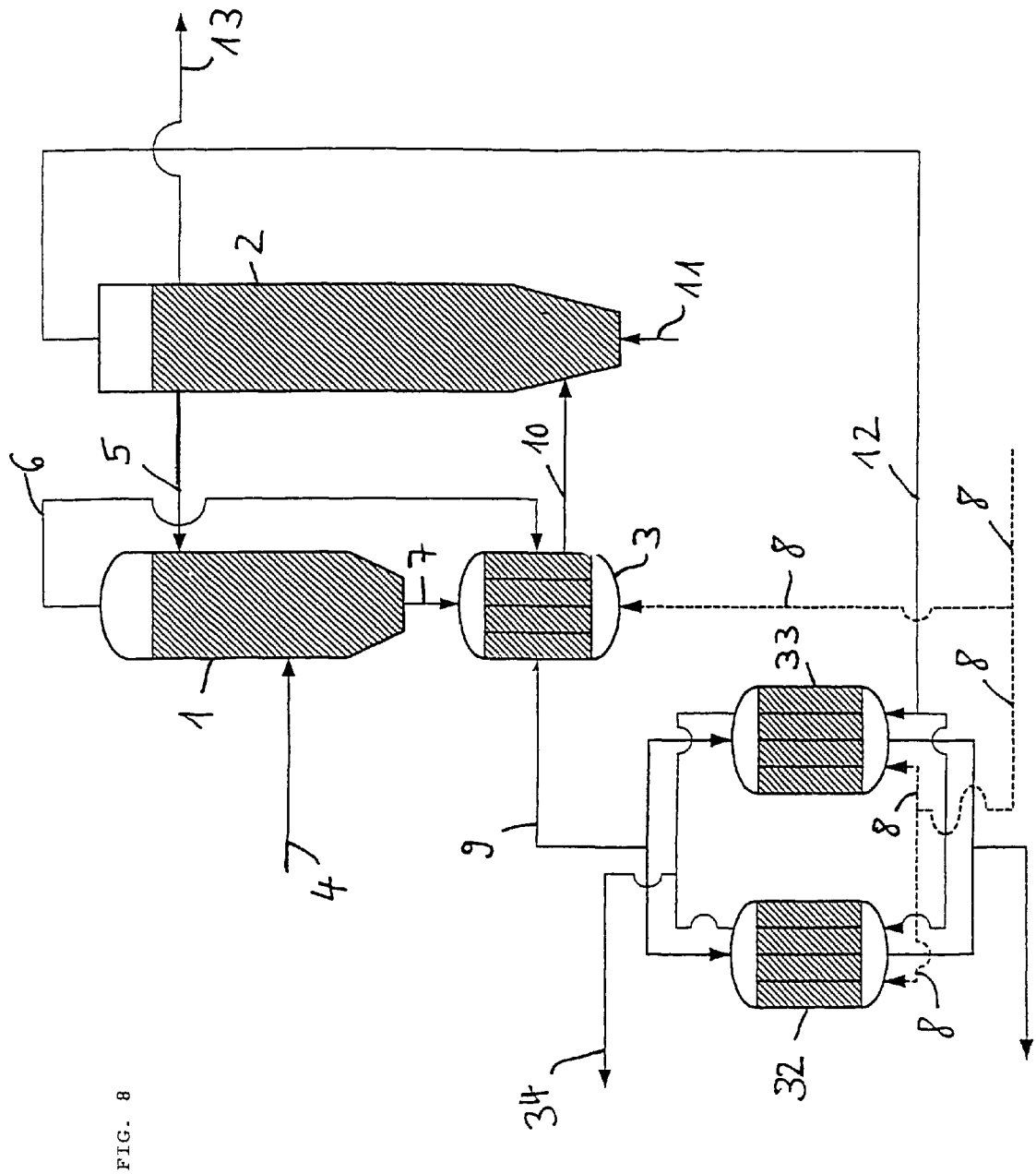
Figure 9:
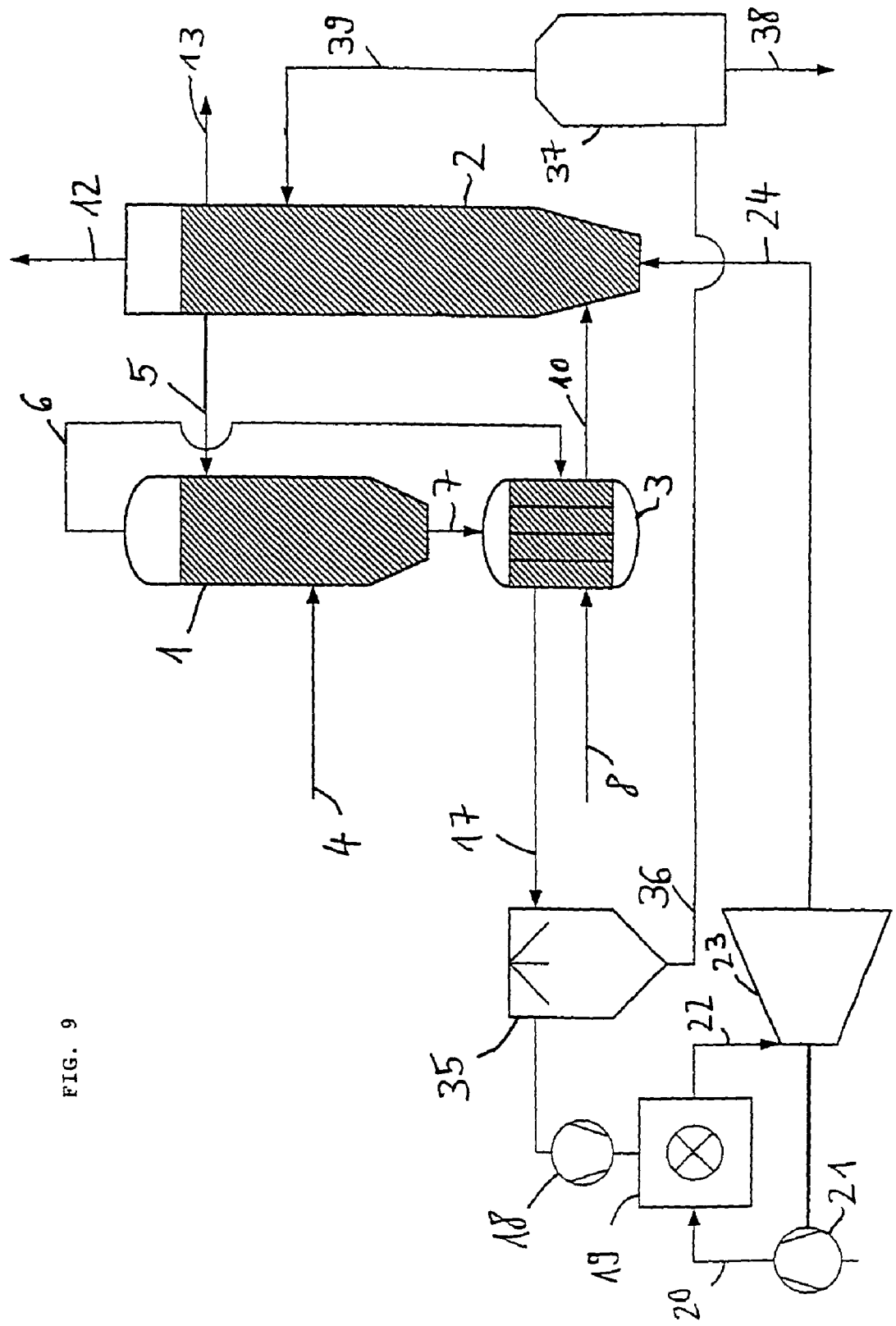

Embodiments of the invention are explained in greater detail hereinafter on the basis of the appended drawings. The drawings show:

FIG. 1 A device for the performance of the method according to the invention for the pyrolysis and gasification of substance mixtures containing organic constituents, in a diagrammatic representation, FIG. 2 The device according to FIG. 1, with a screen for the screening out of a fine fraction, FIG. 3 The device according to FIG. 1, with a gas turbine, FIG. 4 The device according to FIG. 1, with a hydrogen separation arrangement, FIG. 5 The device according to FIG. 1, whereby the fluidised bed reactor is operated in a two-stage procedure, FIG. 6 The device according to FIG. 1, whereby the shaft reactor and the crack reactor are designed as a "pyrolysis-crack reactor" component, FIG. 7 The device according to FIG. 1 with a further reactor with catalyst distribution, FIG. 8 The embodiment according to FIG. 7 with another (second) reactor with catalyst distribution, FIG. 9 The embodiment according to FIG. 3 with a quench and a drying device, and FIG. 10 A further embodiment, in which the catalyst is added or takes effect together with the heat transfer medium.

The basic configuration shown in FIG. 1 for the performance of the basic process consists of a shall reactor 1, a fluidised bed reactor 2, and a crack reactor 3. The organic substances, for preference Trockenstabilat® 4, and the heat transfer medium, for preference ash 6, are delivered to the shaft reactor 1 from the fluidised bed reactor 2. The Trockenstabilat® 4 introduced into the shaft reactor 1 is mixed there with the hot ash 5 from the fluidised bed reactor 2. The Trockenstabilat® heats up and is degasified (pyrolysed). A gas is derived, namely the raw gas 6, as well as a solid 7, namely pyrolysis coke and ash. The raw gas 6 leaves the shall reactor 1 at the upper end, and the solid 7 leaves the shall reactor 1 at the lower end. Raw gas 6 and solid 7 are conducted to the crack reactor 3. Because the solid 7, namely the pyrolysis coke contained therein, takes effect as a catalyst for the gas purification, the raw gas 6 is conducted in the crack reactor 3 through the hot solid. In addition, water vapor 8 is added at this point. As a result, a catalytically-purified gas:9 (synthesis gas, combustion gas) is obtained. The solid 10 from the crack reactor (pyrolysis coke and ash) is introduced into the fluidised bed reactor 2, and combusted there with air 11. The waste gas 12 front the fluidised bed of the fluidised bed reactor 2 is purified. In addition, ash 13 which is not yet required can be drawn off from the fluidised bed reactor 2.

With the conversion of the basic process shown in FIG. 2, a screen 14 is additionally provided, to which the Trockenstabilat® 4 is conducted. The coarse fraction 15 is conducted into the shaft reactor 1. The fine fraction 16 is conducted to the fluidised bed reactor 2.

With the conversion shown in FIG. 3, a combustion gas 17 is produced, which is conducted via a compressor 18 into a mixing chamber 19. There the compressed combustion gas is mixed with air 20, which is compressed by a compressor 21. The mixture 22 is conducted to a gas turbine 23 and there converted into mechanical energy. A part of the mechanical energy from the gas turbine 23 is used to drive the compressor 21 for the air. The compressor 18 can also be driven by the gas turbine 23 (not shown in the drawing). The waste gas 24 from the gas turbine is conducted to the fluidised bed reactor 2. The gas produced in the crack reactor 3, in the embodiment according to FIG. 3, is used as combustion gas 17 for a gas turbine process. The fluidised bed reactor 2 is driven not with air but with the waste gas 24 from the gas turbine 23. This is possible because the waste gas 24 from the gas turbine 23 still has an oxygen content of about 17%.

With the conversion shown in FIG. 4, a hydrogen separation arrangement 25 is provided for, to which the synthesis gas 26 produced in the crack reactor 27 is conducted. The separated hydrogen 27 is used for other purposes. The remaining lean gas 28 with low calorific value is conducted to the fluidised bed reactor 2 for thermal exploitation. To the purpose, the hydrogen separation process 25 takes place at high temperature, so that the tar portions of the synthesis gas 26 cannot condense. For the hydrogen separation use is made for preference of a membrane or a membrane process or a PSA system.

With the embodiment shown in FIG. 5, the fluidised bed reactor 2 is operated as a two-stage process. At the lower end of the fluidised bed reactor 2, less air 11 is added than is required for a stoichiometric combustion process. As a result the ash 5, which is conducted to the shaft reactor 1, still contains coke, which therefore already has a catalytic effect in the upper part of the shaft reactor (degasifier). Above the conveying arrangement for the ash 5 from the fluidised bed reactor 2, additional air, namely secondary air 29, is added, in order to achieve complete combustion, and in order for the waste gas 12—purified—to be discharged into the surrounding area.

With the embodiment shown in FIG. 6, the shaft reactor and the crack reactor are designed as one component, namely as a pyrolysis-crack reactor 30. In this situation, one zone 31, namely the lower zone, of the pyrolysis reactor 1 is used as a catalytic converter.

With the embodiment shown in FIG. 7, in addition to the crack reactor 3 a further reactor 32 is provided with a catalyst deposit arrangement. The raw gas purified by the catalyst in the crack reactor 3 is further purified in the further reactor 32. Water vapour 8 is conducted to the crack reactor 3 and the further reactor 32 in each case. Once the gas or synthesis gas 9 has left the crack reactor 3, it is conducted to the further reactor 32, which is filled with a catalyst deposit. This catalyst deposit consists of one or more metal compounds (permanent catalyst). The crack reactor 3 functions in this case as a pre-catalyst. With the embodiment according to FIG. 7, it would also be possible for the crack reactor 3 to be omitted. In this case the catalytic purification of the raw gas would be carried out by the reactor with the catalyst deposit.

FIG. 8 shows a further version of the embodiment according to FIG. 7. With this further version, in addition to the first further reactor 32 with a catalyst deposit, a second further reactor is provided with a catalyst deposit. The synthesis gas 9 from the crack reactor 3 is conducted alternately to the first further reactor 32 and to the second further reactor 33. The further reactor 32, 33 which happens to be active at the particular time, to which the synthesis gas 9 is conducted, is provided simultaneously with water vapour 8. The other further reactor 33, 32 in each case can be regenerated during this period. For the regeneration, the waste gas 12 from the fluidised bed reactor 2 is used. The waste gas 34 leaving the further reactor 33, 32 in each case can be conducted to a waste gas purification system.

With the embodiment according to FIG. 8, the crack reactor 3 is also not necessarily required. If the crack reactor 3 is not present, its task is fulfilled by the further reactors 32, 33, or by the further reactor 32 or 33 which is in operation at the particular time.

As can be seen from FIG. 8, the gas which leaves the crack reactor 9—which in this case is not absolutely necessary—is conducted to a further reactor 32, which is filled with a catalyst deposit. This catalyst deposit consists, for example, of one or more metal compounds (as in the embodiment according to FIG. 7). The catalyst deposit is reduced in its effectiveness by the constituents contained in the synthesis gas 9, such as, for example, dust, carbon, etc. As a result, a second further reactor 33 is provided in parallel to the first further reactor 32, which, during the active period of the first further reactor 32, is regenerated by hot waste gas 12 from the fluidised bed reactor 2. In this situation this catalyst deposit of the second further reactor 33 is heated by the hot waste gas 12 and by the reactions taking place. As soon as the catalyst deposit in the first further reactor 32 ebbs in its effect, the gas flow of the synthesis gas 9 for the purification is conducted through the catalyst deposit of the second further reactor 33, and the catalyst deposit of the first further reactor 32 is regenerated by the conducting through it of hot waste gas 12 from the fluidised bed reactor 2.

FIG. 9 shows a conversion of the embodiment shown in FIG. 3, in which the combustion gas 17 is conducted through a quench 35 before compression 18. Before the combustion gas 17 for the burner chamber 19 is compressed in the compressor 18, it is cooled and purified in the quench 35. The waste water 36 from the quench 35 is conducted to a dryer 35, in which it is evaporated. The dryer vapours are condensed, and can be discharged as waste water 38 without further clarifying. The "thickened" residue 39 from the dryer 37 contains all the organic constituents. It is conducted to the fluidised bed reactor 2 and there undergoes thermal treatment. As an alternative, direct thermal treatment of the whole of the waste water 36 occurring in the quench 35 is possible in the fluidised bed of the fluidised bed reactor 2 (in this case, the waste water 36 of the quench 35 is conducted directly to the fluidised bed reactor 2, i.e. without the dryer 37, as waste water 39; this is not shown in the drawing).

With the embodiments shown in FIGS. 1 to 9, the catalytic effect of the pyrolysis coke produced in the shaft reactor 1 is exploited. With these embodiments, the crack reactor 3 is integrated into the flow of solids from the shaft reactor 1 into the fluidised bed reactor 2. Taking account of the temperature level, however, a gas treatment would be desirable in that area of the shaft reactor 1 in which the ash 5 from the fluidised bed reactor 2 is conducted, since it is there that the solid (the ash) has the highest temperature level.

In order to achieve this, provision may be made for the conduct of the process according to FIG. 10. In this case, a catalyst 40 is introduced in the upper part of the shaft reactor 1. The shaft reactor and the crack reactor are designed in this case too as one component, namely as a pyrolysis-crack reactor 30'. The addition of the catalyst 40 in the upper part of the shaft reactor 1 does not necessarily have to be carried out with the ash 5 from the fluidised bed reactor 2, however. The catalyst can also be added by other means. In addition, the catalyst may be present in the upper area of the shaft reactor 1, i.e. in the area designated by 41 of the pyrolysis-crack reactor 30'. With the embodiment according to FIG. 10, a permanent catalyst can be used, such as metal oxide. It is also possible, however, for a lost catalyst to be used, such as coke or coal. With the use of a permanent catalyst, a circuit is produced through the fluidised bed reactor 2, whereby the thermal purification of the catalyst takes place in the firing of the fluidised bed reactor 2. The crack reactor is automatically integrated into the shaft reactor 1, so that this becomes the pyrolysis-crack reactor 30'.

The invention claimed is:

1. A device for the pyrolysis and gasification of substance mixtures containing organic constituents, comprising
   a pyrolysis reactor (1) having an inlet (4) through which the organic substances or the substance mixture containing the organic constituents are introduced, a conduit (5) through which a heat transfer medium is introduced, and an outlet (7) for conveying, pyrolysis coke to a crack reactor (3);
   a fluidised bed combustion reactor (2) separate from the pyrolysis reactor (1) for the combustion of the pyrolysis coke and for the generation of the heat transfer medium for the pyrolysis reactor (1), wherein ash material from said fluidised bed forms said heat transfer medium and said fluidised bed combustion reactor (2) includes an ash conduit (5) extending from the an upper portion of the fluidised bed combustion reactor (2) to the pyrolysis reactor (1) and a waste gas conduit (12) extending from the upper portion of the fluidised bed combustion reactor (2) through which waste gas is discharged; and
   a non-fluidised crack reactor (3) separate from said pyrolysis reactor (1) and said fluidised bed combustion reactor (2), said crack reactor (3) having an inlet (8) for receiving water vapor and an outlet (9) for discharging synthesis gas, said crack reactor (3) being connected to said pyrolysis reactor (1) at one end and said fluidised bed combustion reactor (2) at an opposite end so as to receive raw gas from the pyrolysis reactor (1) through a conduit (6) extending from an upper portion of the pyrolysis reactor (1) to the crack reactor (3) for the purification of the raw gas generated by the pyrolysis, said crack reactor is integrated into the flow of solids from the pyrolysis reactor (1) into the fluidised bed combustion reactor (2) and comprising means for cracking and purifying the raw gas (6) using solids from the pyrolysis and/or combustion reactors (1,2) as catalyst.

2. The device according to claim 1, wherein a catalyst is provided in the crack reactor.

3. The device according to claim 1, having a screen (14) for screening out, or other separation device for the separation, of a fine fraction (16) from the organic substances (4).

4. The device according to claim 1, having a gas turbine (23) for the exploitation in terms of energy of the synthesis gas (17) from the crack reactor (3).

5. The device according to claim 4, having a quench (35) for the cooling and/or purification of the synthesis gas (9).

6. The device according to claim 5, having a dryer (37) for the cooling and/or purification of the waste water (36) from the quench (35).

7. The device according to claim 1, having a hydrogen separation arrangement (25) for the separation of hydrogen (27) from the synthesis gas (26) from the crack reactor (3).

8. The device according to claim. 1, wherein the combustion reactor (2) can be operated as a two-stage procedure.

9. A device for the pyrolysis and gasification of substance mixtures containing organic constituents, comprising
   a pyrolysis reactor (1) having an inlet (4) through which the organic substances or the substance mixture containing the organic constituents are introduced, a conduit (5) through which a heat transfer medium is introduced, and an outlet (7) for conveying pyrolysis coke to a crack reactor (3);
   a fluidised bed combustion reactor (2) separate from the pyrolysis reactor (1) for the combustion of the pyrolysis coke and for the generation of the heat transfer medium for the pyrolysis reactor (1), wherein ash material from said fluidised bed forms said heat transfer medium and is transferred to said pyrolysis reactor through the conduit (5); said fluidised combination reflector (2) also having a waste gas discharge conduit (12) extending from the upper portion of the fluidised combustion reactor (12); and
   a non-fluidised crack reactor (3) separate from said fluidised bed combustion reactor (2), said crack reactor (3) being connected to said pyrolysis reactor (1) at one end and said fluidised bed combustion reactor (2) at an opposite end so as to receive raw gas from the pyrolysis reactor (1) for the purification of the raw gas generated by the pyrolysis through a conduit (6) extending from the upper portion of the pyrolysis reactor (1) to the crack reactor (3), said crack reactor is integrated into the flow of solids from the pyrolysis reactor (1) into the fluidised bed combustion reactor (2) and comprising means for cracking and purifying the raw gas (6) using solids from the pyrolysis and/or combustion reactors (1,2) as catalyst,
   wherein the pyrolysis reactor (1) and the crack reactor (3) are designed as one component as a pyrolysis-crack reactor (30, 30').

10. The device according to claim 1, including a first further reactor (32) containing a first catalyst deposit.

11. The device according to claim 10, including a second further reactor (33) containing a second catalyst deposit.

12. A device for the pyrolysis and gasification of substance mixtures containing organic constituents, comprising
   a pyrolysis reactor (1) having an inlet (4) through which the organic substances or the substance mixture containing the organic constituents, are introduced, a conduit (5) through which a heat transfer medium is introduced, and an outlet (7) for conveying pyrolysis coke to a crack reactor (3):
   a fluidised bed combustion reactor (2) for the combustion of the pyrolysis coke and for the generation of the heat transfer medium for the pyrolysis reactor (1), wherein ash material from said fluidised bed forms said heat transfer medium and is transferred to said pyrolysis reactor through the conduit (5); and
   a non-fluidised crack reactor (3) for the purification of the raw gas generated by the pyrolysis wherein said crack reactor is connected to said pyrolysis reactor (1) at one end and said fluidised bed combustion reactor (2) at an opposite end so that said crack reactor is integrated into the flow of solids from the pyrolysis reactor (1) into the fluidised bed combustion reactor (2), wherein
   the pyrolysis reactor (1), fluidised bed combustion reactor (2) and crack reactor (3) are arranged with respect to one another such that ash is delivered to the pyrolysis reactor (1) from the fluidised bed combustion reactor (2) through a conduit (5), raw gas is conducted to the crack reactor (3) through a conduit (6) extending from an upper portion of the pyrolysis reactor (1) to the crack reactor (3) and pyrolysis coke and ash (7) generated in the pyrolysis reactor (1) are both conducted to the crack reactor (3) through a conduit (7) extending from the pyrolysis reactor (10) to the crack reactor (3), catalytically purified gas is released from the crack reactor (3) and the pyrolysis coke and ash is fed from the crack reactor (3) to the fluidised bed combustion reactor (2) through a conduit (10).

13. The device according to claim 1 further comprising means for introducing water vapor (8) into the crack reactor (3).

14. The device according to claim 12 further comprising means for introducing water vapor (8) into the crack reactor (3).

15. The device according to claim 1, wherein said crack reactor is a separate reactor.

16. A device for the pyrolysis and gasification of substance mixtures containing organic constituents, comprising a pyrolysis reactor (1) having an inlet (4) through which the organic substances or the substance mixture containing the organic constituents are introduced, a conduit (5) through which a heat transfer medium is introduced, and an outlet (7) for conveying pyrolysis coke to a crack reactor (3);

a fluidised bed combustion reactor (2) separate from the pyrolysis reactor (1) for the combustion of the pyrolysis coke and for the generation of the heat transfer medium for the pyrolysis reactor (1), wherein material from said fluidised bed forms said heat transfer medium; and a crack reactor (3) Separate from said pyrolysis reactor (1) and said fluidised bed combustion reactor (2), said crack reactor (3) being for the purification of the raw gas generated by the pyrolysis integrated into the flow of solids from the pyrolysis reactor (1) into the fluidised bed combustion reactor (2), wherein the pyrolysis reactor (1), fluidised bed combustion reactor (2) and crack reactor (3) are arranged with respect to one another such that ash is delivered to the pyrolysis reactor (1) from the fluidised bed combustion reactor (2), raw gas is conducted to the crack reactor (3) through a conduit (6) extending from an upper portion of the pyrolysis reactor (1) to the crack reactor (3) and pyrolysis, coke and ash generated in the pyrolysis reactor (1) are both conducted to the crack reactor (3) through outlet (7), catalytically purified gas is released from the crack reactor (3) and the pyrolysis coke and ash is fed from the crack reactor (3) to the fluidised bed combustion reactor (2).

17. The device according to claim 2 wherein the catalyst provided in the crack reactor is a metal oxide.

\* \* \* \* \*